(No Model.)

C. A. SCHMIDT.
CHAIN FOR DRAPERIES.

No. 294,682. Patented Mar. 4, 1884.

WITNESSES:
C. Neveux
C. Sedgwick

INVENTOR:
C. A. Schmidt
BY Munn & Co
ATTORNEYS.

UNITED STATES PATENT OFFICE.

CHRISTIAN A. SCHMIDT, OF HOBOKEN, NEW JERSEY.

CHAIN FOR DRAPERIES.

SPECIFICATION forming part of Letters Patent No. 294,682, dated March 4, 1884.

Application filed January 7, 1884. (No model.)

*To all whom it may concern:*

Be it known that I, CHRISTIAN A. SCHMIDT, of Hoboken, Hudson county, New Jersey, have invented a new and Improved Chain for Draperies, of which the following is a full, clear, and exact description.

The object of my invention is to provide a new and improved chain for draperies, furniture, and upholstery-trimmings.

The invention consists in a chain on which tufts or balls of fibrous material are secured at suitable intervals, the said tufts or balls being held on the links or between the links, as may be desired.

Reference is to be had to the accompanying drawings, forming part of this specification, in which similar letters of reference indicate corresponding parts in both the figures.

Figure 1:
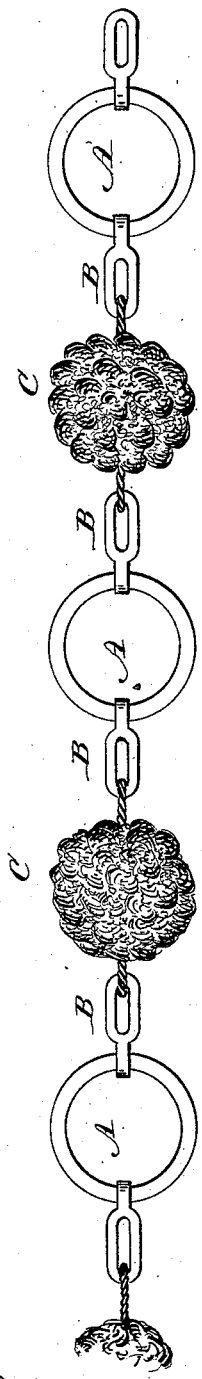
Figure 2:
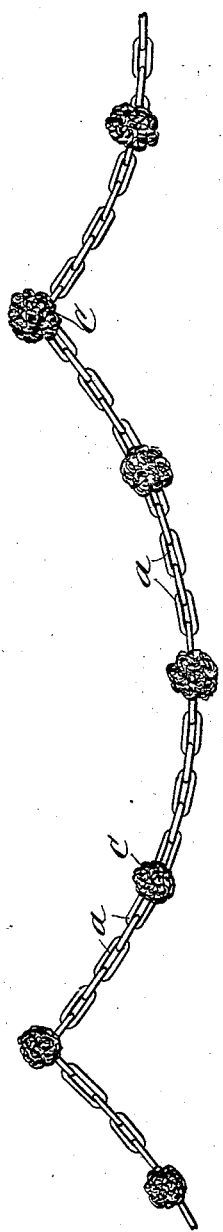

Figure 1 is a longitudinal view of a piece of my improved chain for draperies, and Fig. 2 is a similar view of a chain of a modified construction.

The chain is formed of links and tufts or balls made of any fibrous material. The links can be made of wood, metal, rubber, celluloid, or other suitable material, metal being preferred. The links can have any desired suitable shape or size, and can be united in any desired manner. The tufts can be secured on the links, or can be held between the links.

The chain shown in Fig. 1 is composed of rings A, short links B, and balls or tufts C, held between the short links B; but two or more rings, A, and a corresponding number of links, B, can be held between the balls C, or the rings can be replaced by other links. The tufts or balls can be made larger or smaller than the links forming the chain.

The chain shown in Fig. 2 is composed of a series of links, a, of uniform shape and size, and the tufts or balls C are secured on the links. They can be spaced to be a greater or less distance apart. The balls or tufts can have a body or core of wood or other material, on which the fibrous material is fastened or spun.

Having thus described my invention, I claim as new and desire to secure by Letters Patent—

1. As an improved article of manufacture, a chain on which balls or tufts of fibrous material are secured at intervals, substantially as herein shown and described.

2. The combination, with a chain, of a series of balls or tufts of fibrous material held on the chain, the said tufts or balls being suitably spaced, substantially as herein shown and described.

3. The combination, with the links B and the rings A, of the balls or tufts C, forming a chain with the said links and rings, substantially as herein shown and described.

CHRISTIAN A. SCHMIDT.

Witnesses:
OSCAR F. GUNZ,
C. SEDGWICK.